(12) United States Patent
Bowden

(10) Patent No.: US 9,791,062 B2
(45) Date of Patent: Oct. 17, 2017

(54) HYDRAULIC VALVE HAVING PRESSURE COMPENSATED FLOW CONTROL

(71) Applicant: Charles J. Bowden, Battle Creek, MI (US)

(72) Inventor: Charles J. Bowden, Battle Creek, MI (US)

(73) Assignee: FEMA CORPORATION OF MICHIGAN, Portage, MI (US)

( * ) Notice: Subject to any disclaimer, the term of this patent is extended or adjusted under 35 U.S.C. 154(b) by 86 days.

(21) Appl. No.: 14/862,910

(22) Filed: Sep. 23, 2015

(65) Prior Publication Data

US 2016/0103455 A1    Apr. 14, 2016

Related U.S. Application Data

(60) Provisional application No. 62/063,074, filed on Oct. 13, 2014.

(51) Int. Cl.
| | |
|---|---|
| *F16K 11/07* | (2006.01) |
| *F16K 31/04* | (2006.01) |
| *G05D 7/00* | (2006.01) |
| *F16K 31/06* | (2006.01) |

(52) U.S. Cl.
CPC ........... *F16K 31/041* (2013.01); *F16K 11/07* (2013.01); *F16K 31/0613* (2013.01); *F16K 31/0668* (2013.01); *G05D 7/005* (2013.01); *Y10T 137/8671* (2015.04)

(58) Field of Classification Search
CPC ....... Y10T 137/8659; Y10T 137/86614; Y10T 137/86702; Y10T 137/8671; F16K 31/041; F16K 11/07; F16K 31/0613; F16K 31/0668; G05D 7/005
See application file for complete search history.

(56) References Cited

U.S. PATENT DOCUMENTS

| | | | | |
|---|---|---|---|---|
| 4,238,112 A | * | 12/1980 | Derozier | ................. F15B 13/04 137/625.65 |
| 4,303,091 A | | 12/1981 | Hertell et al. | |
| 4,355,655 A | | 10/1982 | Hertell et al. | |
| 6,021,876 A | * | 2/2000 | Bowden | ................. B60K 25/00 137/625.61 |
| 7,628,378 B2 | | 12/2009 | Adams et al. | |
| 2006/0081298 A1 | * | 4/2006 | Segi | .................... F16K 31/0613 137/625.64 |

(Continued)

*Primary Examiner* — Jessica Cahill
(74) *Attorney, Agent, or Firm* — Flynn, Thiel, Boutell & Tanis, P.C.

(57) ABSTRACT

A hydraulic valve having a hollow valve body configured with a supply port and a supply port. The hollow valve body has several different internal diameters. An elongate spool is reciprocally received in the body and has a large diameter annular spool ring oriented adjacent a sensing land inside the hollow body forming a gap with a sensing land to cause a pressure drop across the gap in response to a flow of fluid from the pressure port through the gap to the control port. A servomotor reciprocally drives the spool lengthwise of the valve body against a spring force. When flow of fluid occurs in response to servomotor movement of the spool, the pressure drop across the gap combined with the spring force determines a pressure balanced location to which the spool is moved.

17 Claims, 13 Drawing Sheets

(56) References Cited

U.S. PATENT DOCUMENTS

| | | | |
|---|---|---|---|
| 2008/0308757 A1* | 12/2008 | Nakai | F16H 61/0251 |
| | | | 251/129.15 |
| 2011/0067771 A1* | 3/2011 | Navale | F16K 11/0708 |
| | | | 137/625.25 |
| 2011/0226364 A1* | 9/2011 | Holl | F15B 13/0402 |
| | | | 137/625.69 |
| 2011/0315257 A1* | 12/2011 | Anderson | F16K 11/0716 |
| | | | 137/625.69 |
| 2012/0012768 A1* | 1/2012 | Yahr | F16K 1/02 |
| | | | 251/129.11 |
| 2012/0211686 A1* | 8/2012 | Okamoto | F16K 31/0624 |
| | | | 251/129.15 |

\* cited by examiner

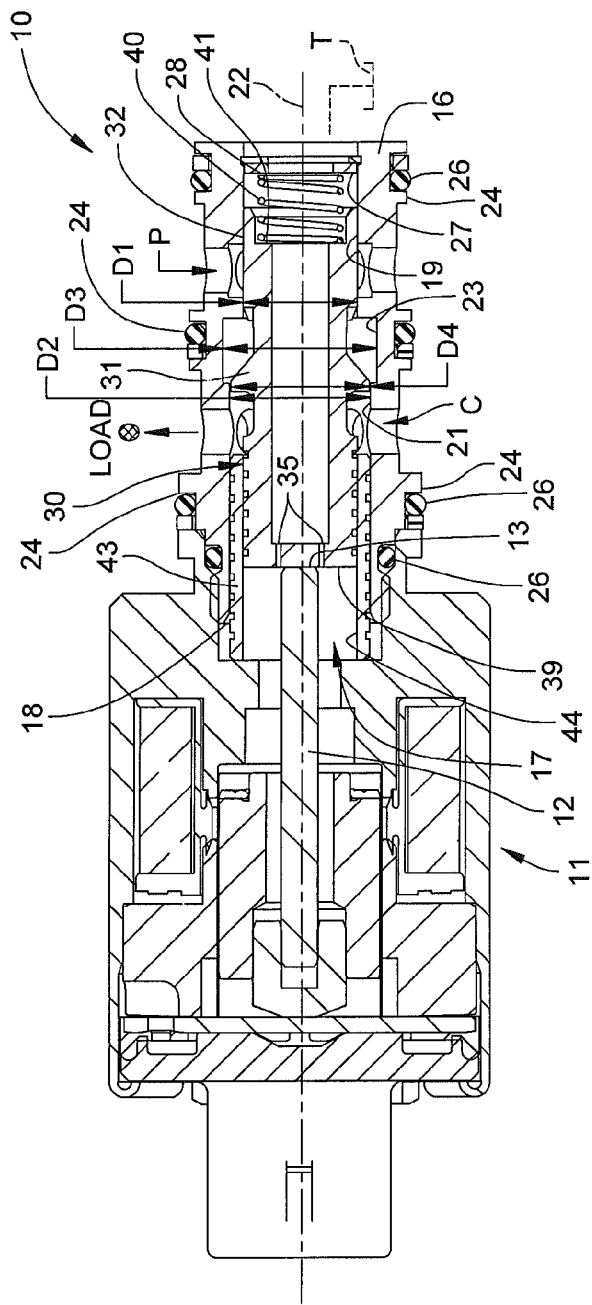
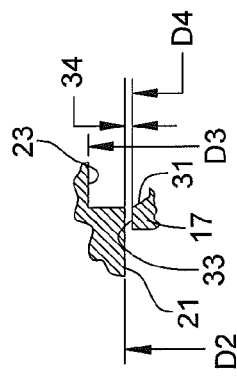
FIG. 1
FIG. 1A

PC PRESSURE IS LINEAR TO INPUT COMMAND

HYDRAULIC VALVE HAVING PRESSURE COMPENSATED FLOW CONTROL

CROSS REFERENCE TO RELATED APPLICATION

This claims the benefit of U.S. Provisional Application No. 62/063,074, filed Oct. 13, 2014, which is hereby incorporated by reference in its entirety.

FIELD OF THE INVENTION

This invention relates to a hydraulic valve, and more particularly, a hydraulic valve having a pressure compensated flow control feature.

BACKGROUND OF THE INVENTION

A typical flow control valve today consists of a direct drive spool valve used to vary a controlled flow area and an additional spool valve which senses the flow pressure drop across the first valve and restricts or relieves flow in order to maintain a constant flow to a work port regardless of the required working pressure.

It is an object of the invention to provide a low flow, easily assembled, low cost flow control valve that enables the aforementioned valve to be replaced with the valve embodying the invention.

It is a further object of the invention to provide a direct drive spool valve that incorporates both functions into one spool, that is, both the controlled flow area and the restricting and relieving area functions are controlled simultaneously to maintain constant flow.

SUMMARY OF THE INVENTION

The objects and purposes of the invention are met by providing a hydraulic pressure compensated flow control valve having a hollow valve body with a supply port and a control port. The hollow valve body has several different internal diameters. An elongate spool is reciprocally received in the hollow body and includes a large integral annular spool ring oriented adjacent a sensing land to form a gap between a perimeter of the spool ring and the sensing land to cause a pressure drop across the gap in response to a flow of fluid from the pressure port through the gap to the control port. A servomotor drives the spool lengthwise within the valve body against a spring force. A magnitude of the pressure drop across the gap combined with the spring force determining a pressure balanced location to which the spool is moved in response to the output force from the servomotor to thereby control the rate of flow of hydraulic fluid from the pressure port to the control port.

BRIEF DESCRIPTION OF THE DRAWINGS

Other objects and purposes of the invention will be apparent to persons acquainted with apparatus of this general type upon reading the following specification and inspecting the accompanying drawings, in which:

FIG. 1 illustrates a longitudinal sectional view of a hydraulic valve embodying a first embodiment of my new invention in a dormant state;

FIG. 1A is an enlarged fragment of FIG. 1;

DETAILED DESCRIPTION

Figure 2:
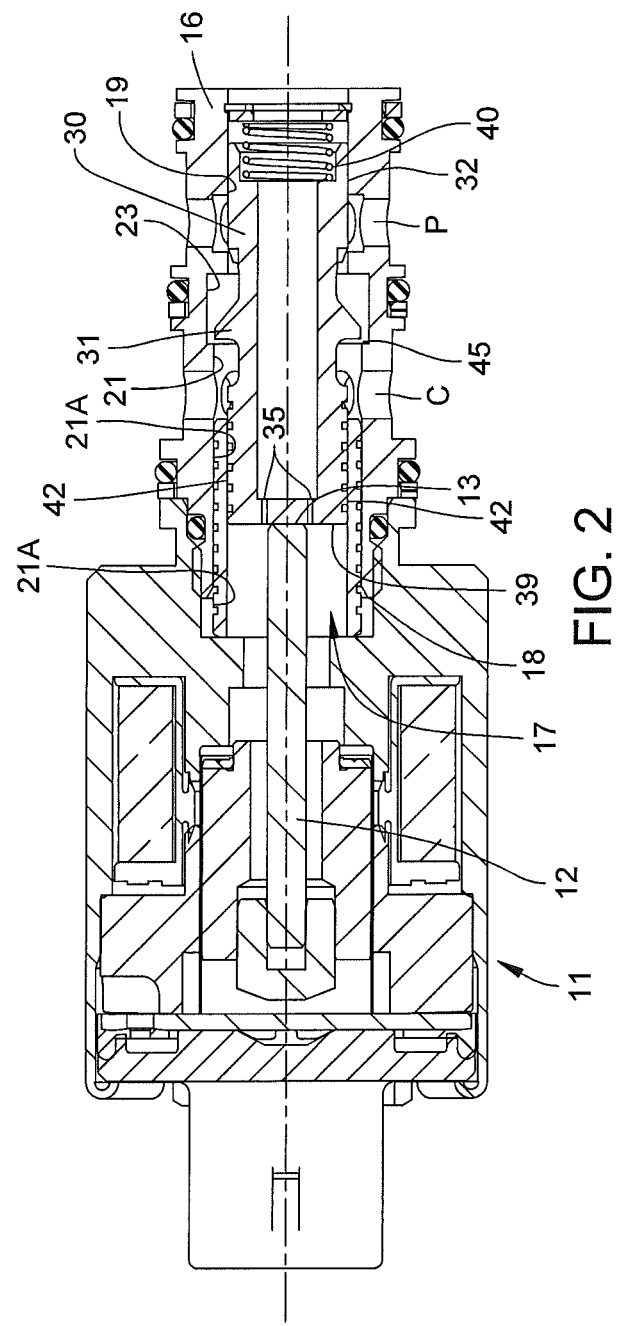
FIG. 2 is a view similar to FIG. 1 with valve in a first operative state.

Certain terminology has been used above and will be used in the following description for convenience in reference only and will not be limiting. The words "up", "down" "right" and "left" will designate directions in the drawings to which reference is made. The words "in" and "out" will refer to directions toward and away from, respectively, the geometric center of the device and designated parts thereof. Such terminology will include derivatives and words of similar import.

First Embodiment of FIGS. 1 to 4

FIGS. 1 to 4 illustrate a first embodiment of a hydraulic valve 10 embodying my invention, with FIG. 1 illustrating the valve in its dormant state, that is, no hydraulic pressure is being applied thereto and there is no supply of electrical energy. This embodiment of the valve 10 includes a conventional electric servomotor 11 having a reciprocal output member 12 having a distal end 13. Since the electric servomotor is well known to those skilled in this art, see examples thereof in U.S. Pat. Nos. 6,021,876 and 7,628,378, a further detailed discussion thereof is deemed unnecessary. Since servomotor 11 will produce a nonlinear output force characteristic at the distal end of the output member 12 and will be a function of a resistance to movement load applied to it at the distal end 13.

The valve 10 includes a valve body 16 having an elongate and cylindrical internal bore 17 therein opening outwardly at least at one end 18 of the valve body. The valve body 16 includes a supply port P configured to be connected to a pressurized fluid source and an axially spaced control port C configured to be connected to a load. The internal bore 17 has first segment 19 with a first inner diameter D1 and a second segment 21 with a second inner diameter D2 that is larger than the diameter D1. The first and second segments are both coaxial with a longitudinal axis 22 of the internal bore 17. The two segments are located between the supply port P and the longitudinally spaced control port C. The internal bore 17 also has a third segment 23 located between the first and second segments and having a third internal diameter D3 that is larger than the diameter D2. The radially outer peripheral surface of the valve body 16 is provided with structure that forms plural and axially spaced annual grooves 24 that each house an O-ring seal member 26 to facilitate the sealed placement of the valve body 16 inside a conforming bore provided in a further structure not shown.

The internal bore 17 of the valve body 16 has an axially facing abutment surface 27 defined by a plate 28 resting against a spring clip 29 received an annular groove in the surface of the first segment 19.

Figure 3:
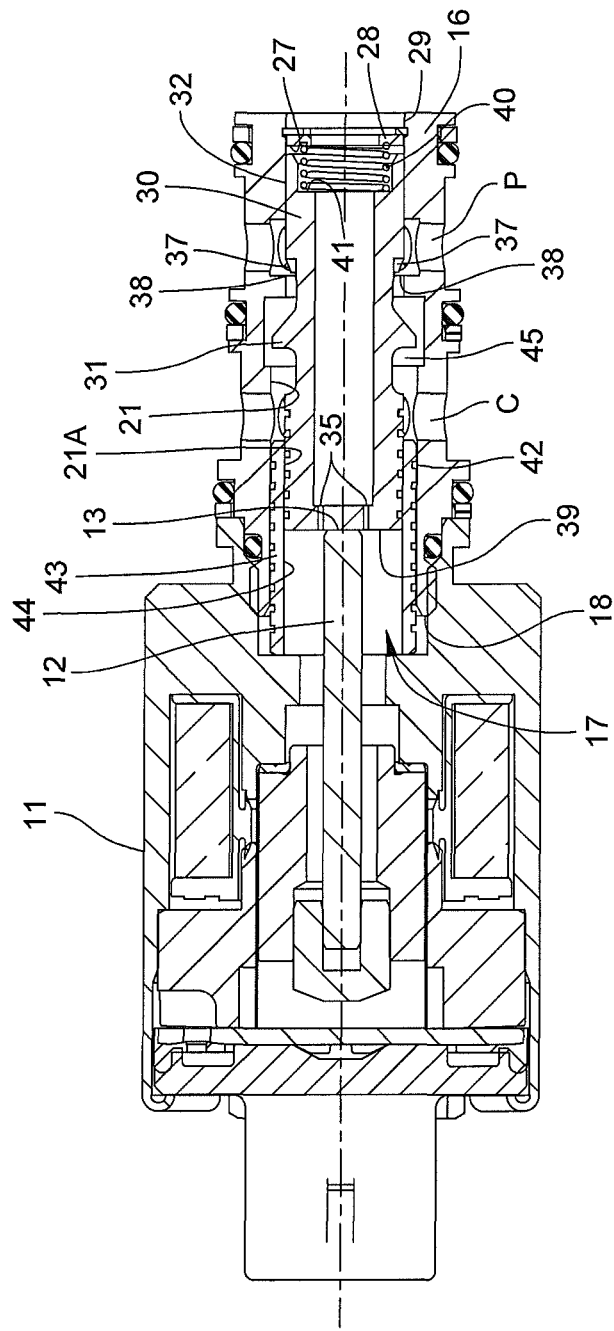
FIG. 3 is a view similar to FIG. 2 with the valve in a second operative state.
Figure 4:
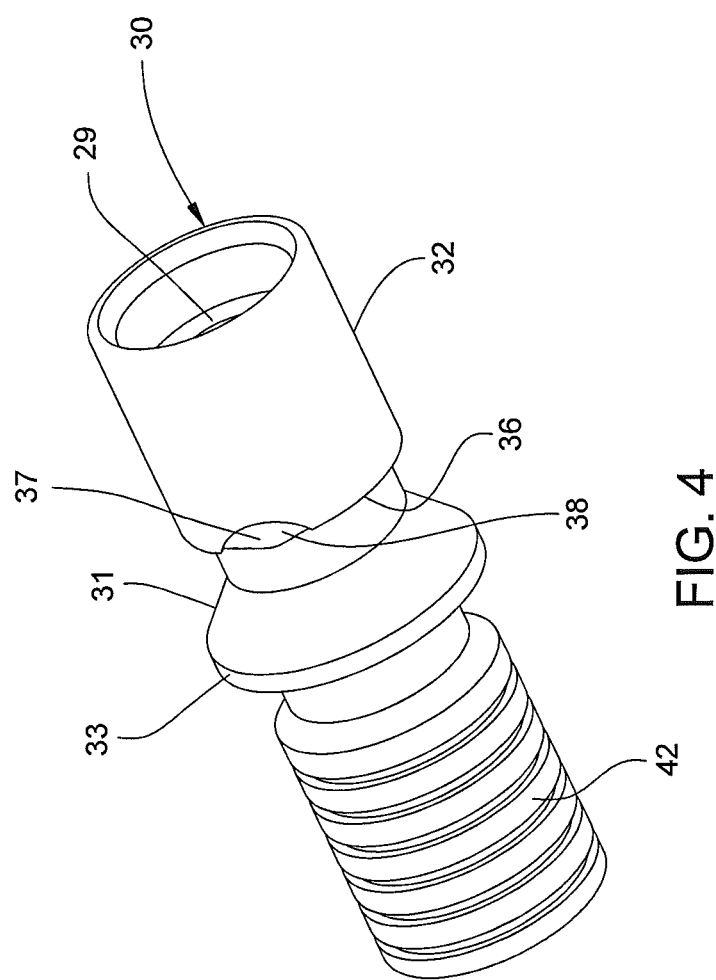
FIG. 4 is a front, right end isometric view of the spool is the aforesaid first embodiment.

An elongate and hollow spool 30 (FIG. 4), circular in cross section, is reciprocally received in the open end 18 of the internal bore 17 of the valve body 16. A cylindrical surface 32 is provided on the spool and is received in the first segment 19 of the internal bore 17, the surface 32 having a diameter that is conformed to the diameter D1 to form thereat a close sliding tolerance fit relation to the first diameter segment. The spool 30 also has an integral annular spool ring 31 that is axially spaced from the surface 32 and which is configured to be located, in the dormant state of the valve 10, within the second segment 21 of the internal bore 17. The spool ring 31 has a cylindrical radially outer circumferential surface 33 having an outer diameter D4 that is slightly less than the second diameter D2 to form a gap 34 in between the surface of the second segment 21 and the external periphery of the annular spool ring 31 as shown in an enlarged FIG. 1A. As the spool 30 is shifted rightwardly to, for example, the FIG. 2 or FIG. 3 position, the periphery of the spool ring 31 will move to a location wholly within the third segment 23 of the internal bore 17 resulting in an enlargement of an gap 33 between the periphery of the spool ring 31 and the surface of the second segment 21 as well as an increase in the axial spacing between the periphery of the spool ring 31 and the internal surface of the third segment 23 having the diameter D3 as shown in FIGS. 2 and 3 to define a sensing orifice 45 (FIGS. 2 and 3).

The cylindrical surface 32 is of a finite longitudinal length with an edge 36 thereof (FIG. 4) adjacent the third segment 23 and facing the spool ring 31 being provided with at least one notch 37 having a tapered bottom wall 38 increasing in depth between a mid-section of the surface 32 and the edge 36. If desired, plural identical notches can be provided at circumferentially spaced locations in the surface 32 and the edge 36.

The spool 30 has an axial end face 39 located at a longitudinal end of the spool that is remote from the surface 32 and is engaged by the distal end 13 of the output member 12 of the electric servomotor 11. The end face 39 closes the end of the hollow spool thereat with two vent holes 35 for hydraulic balancing and, in some cases, hydraulic damping. The opposite end of the spool 30 has an axially facing abutment surface 41 opposing the abutment surface 27. A spring 40 is located between the surfaces 27 and 41 and is configured to oppose rightward movement of the spool 30.

A peripheral surface 42 at an end of the spool 30 remote from the surface 32 is, in this embodiment, of the same diameter as the surface 32 and is located in an extension segment 21A of the second segment 21 of the bore 17 in the valve body 16 which has the same inner diameter as the second segment 21. This will facilitate the installation of the spring 40 and spool 30 with its larger diameter spool ring 31 into the bore 17 through the open end 18 so that the spring 40 is oriented between the abutment surfaces 27 and 41. To accommodate the radial spacing between the peripheral surface 42 and the inner surface of the extended second segment 21A, a hollow sleeve 43 is force fit or press fit into the axial end of the extension segment 21A of the second segment adjacent the open end 18 so as to be fixedly secured to the valve body 16. An interior of the hollow sleeve 43 has an internal surface 44 with a diameter conforming to the external diameter of the surface 42 to form a close sliding tolerance fit relation to the hollow sleeve 43.

Operation of the FIGS. 1-4 Embodiment

While the operation of the valve 10 will be understood by those skilled in the art, the below set forth description of the operation is being provided only for convenience in understanding.

As stated above, the hydraulic valve 10 illustrated in FIGS. 1 and 1A is in a dormant state. As depicted in FIG. 1, the spring force of the spring 40 initially locates the surface 32 on the spool 30 so as to block the pressure supply port P and orient the spool ring 31 wholly within the second segment 21 of the internal bore 17 as illustrated in FIG. 1A.

The following explanation of the operation of the valve 10 assumes that the supply pressure at the port P is greater than the required pressure at the control port C.

During operation the servomotor 11 is given an electrical input command for a flow rate. The servomotor 11, in response to this command, pushes the distal end 13 of the output member 12 so that the spool 30 is pushed against the bias spring 40, opening a communication, via the notches 37 between port P and C. In addition, an area (delta P sensing orifice 45 shown in FIGS. 2 and 3) is established between the spool ring 31 and the inner diameter D3 related to an area of the notches 37 and a flow of hydraulic fluid will begin passing from the port P across the sensing orifice 45 to port C creating a differential pressure from one side of the spool ring 31 to the other with the port P side being higher. This higher pressure applied to the spool ring area creates a load in opposition to the output load from the servomotor 11. The spool ring load plus the bias load provided by the spring 40 will strive to obtain a load balance against the output load of the servomotor 11.

The spool 30, in response to any load imbalance, will automatically move to a position which either increases or decreases the flow from port P to port C until a stabilized flow rate is achieved in response to the load balance with the output load of the servomotor 11 being achieved.

For example, if the load from the servomotor 11 is greater than the sum of the load applied to the spool ring 31 and the load from the spring 40, the servomotor will continue to push the spool 30, increasing the area of the notches 37 and communication from the port P to the port C. This increased area allows more flow from the port P to the port C and across the spool sensing orifice 45, increasing the pressure drop and increasing the opposition load from the servomotor 11 until the loads become balanced. The spool 30 stops at this point and maintains that flow value.

As another example, if the load from the servomotor 11 is less than the sum of the load applied to the spool ring 31 and the load from the spring 40, this opposition load will push the spool 30 against the distal end 13 of the output member 12 on the servomotor, reducing the exposed area provided by the notches 37 and fluid communication from the port P to the port C. This reduction in the notch area reduces the flow rate from port P to port C and across the spool sensing orifice 45, reducing the pressure drop and reducing the opposition load until the servomotor load and the opposition load become balanced. The spool 30 stops at this point and maintains this flow rate.

Once the required flow rate is achieved, it will remain at the established level until commanded otherwise. If the electrical input command to the servomotor 11 is either increased or decreased from this point on, the change in servomotor load sets up an imbalanced load condition. The spool 30, in response to the change in servomotor output, is moved as described above until the new required flow rate is achieved.

If for some reason the pressure requirement (working load) changes at port C, the following will occur. For example, if the pressure requirement increases at port C, the flow rate will tend to slow down. In response to this reduction in flow rate, the pressure drop across the spool sensing orifice 45 will start to lower. The opposition load against the output from the servomotor will become reduced resulting in the servomotor output moving the spool 30 against the force from the spring 40 and an increase in the exposed area of the notches 37. This increase in notch area allows flow to pass with less restriction from port P to port C allowing the load balance to be reestablished with a minimal reduction in flow rate.

If, on the other hand, the pressure requirement decreases at the port C, the flow rate will tend to speed up. In response to this increase in flow rate, the pressure drop across the spool sensing orifice 45 will start to increase. The opposition load against the load applied by the servomotor 11 increases and the spool 30 will move against the output of the servomotor decreasing the exposed area of the notches 37. This decrease in notch area resists a change in flow rate from port P to port C allowing the load balance to be reestablished with a minimal increase in flow rate.

Second Embodiment of FIGS. 5 to 8

FIGS. 5 to 8 illustrate a second embodiment of a hydraulic valve embodying my invention. Since the second embodiment of FIGS. 5 to 8 includes many instances of structure identical to the first embodiment, the same reference numbers will be used in describing the second embodiment but will have 100 added thereto.

Figure 5:
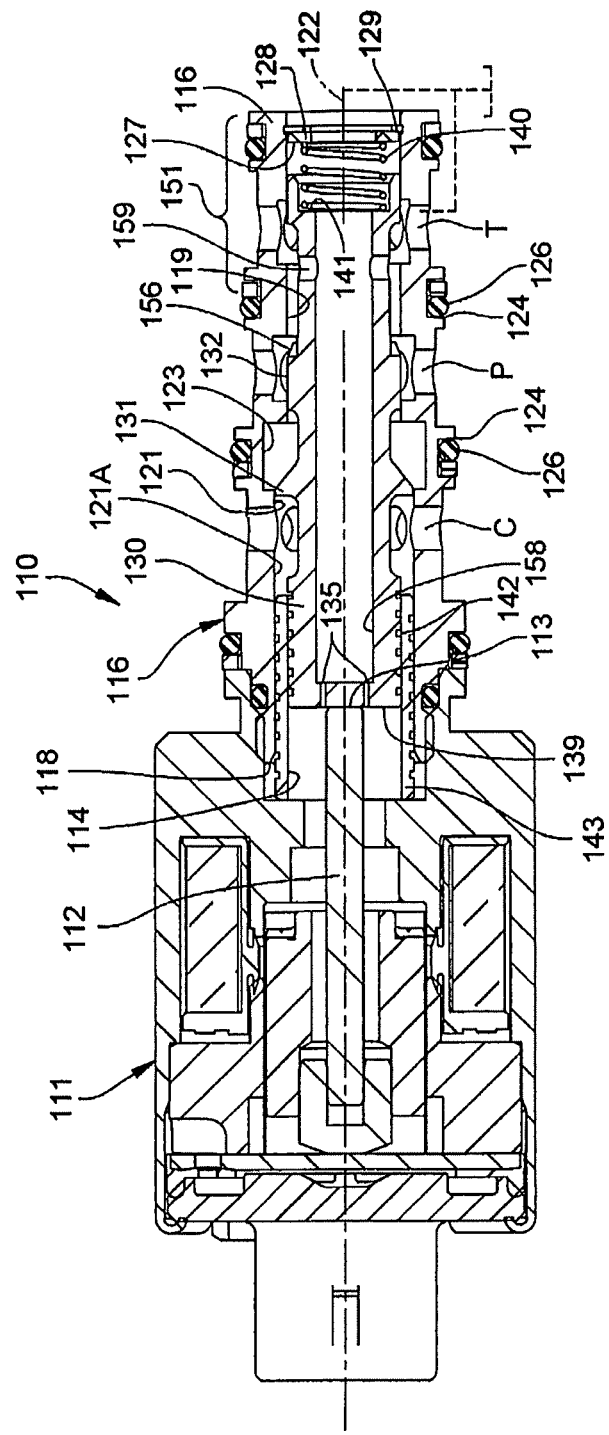
FIG. 5 illustrates a longitudinal sectional view of a hydraulic valve embodying a second embodiment of my new invention in a dormant state.

FIG. 5 illustrates the valve 110 in its dormant state, that is, no hydraulic pressure is being applied thereto and there is no supply of electrical energy. This embodiment of the valve 110 includes a conventional electric servomotor 111 having a reciprocal output member 112 having a distal end 113.

The valve 110 includes a valve body 116 having an elongate and cylindrical internal bore 117 therein opening outwardly at least at one end 118 of the valve body. The internal bore 117 has, just like in the first embodiment, a first segment 119 with a first inner diameter D1 and a second segment 121 with a second inner diameter D2 that is larger than the diameter D1. The first and second segments are both coaxial with a longitudinal axis 122 of the internal bore 117. The two segment are located between a supply port P and a longitudinally spaced control port C, both being provided in the valve body 116. The internal bore 117 also has a third segment 123 located between the first and second segments and having a third internal diameter D3 that is larger than the diameter D2. The radially outer peripheral surface of the valve body 116 is provided with structure that forms plural and axially spaced annual grooves 124 that each house an O-ring seal member 126 to facilitate the sealed placement of the valve body 116 inside a conforming bore provided in a further structure not shown. In this particular embodiment, the valve body 116 is longer than the valve body 16; specifically has an extended portion 151 which is extended in a direction away from the servomotor 111 to provide a tank port T to facilitate a connection to a tank and a low pressure. The extended portion 151 of the valve body 116 includes an inner diameter conforming to the diameter D1.

The internal bore 117 of the extended portion 151 of the valve body 116 has an axially facing abutment surface 127 defined by a plate 128 resting against a spring clip 129 received in an annular groove in the inner surface of the bore 117 located in the extended portion 151.

Figure 6:
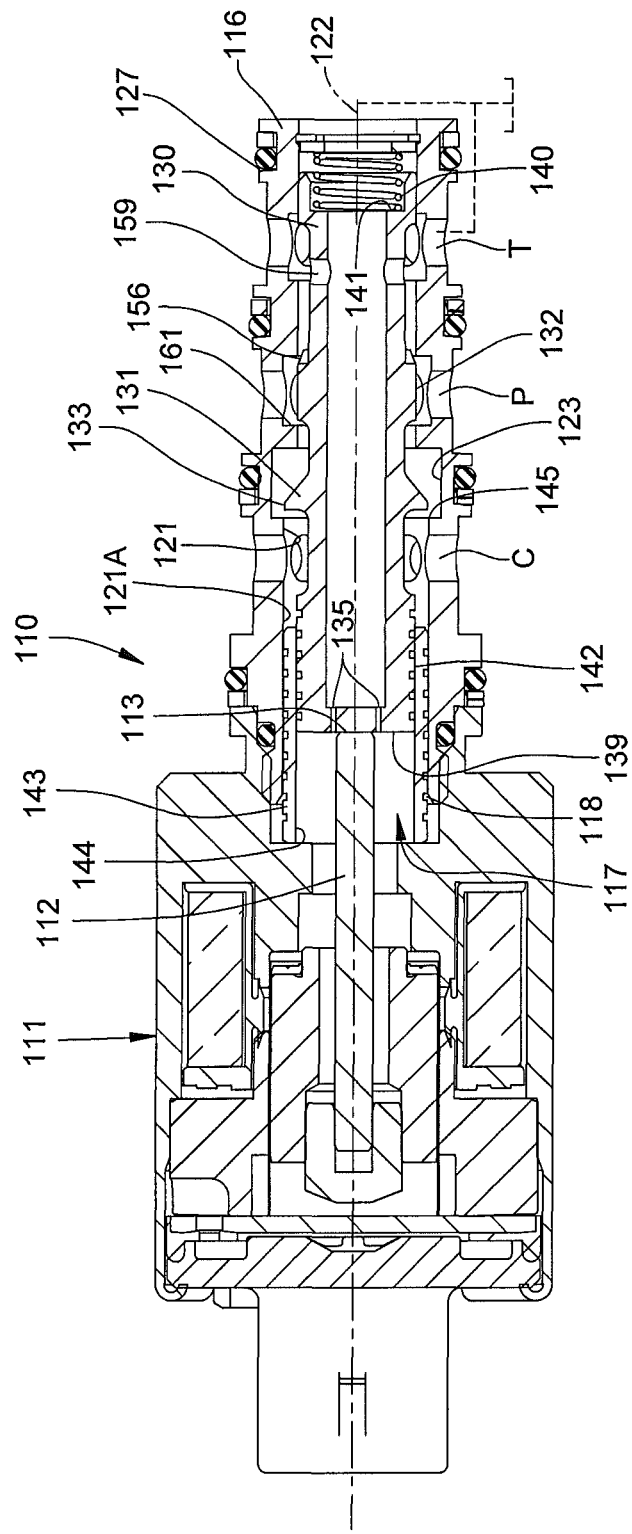
FIG. 6 is a view similar to FIG. 5 with valve in a first operative state.
Figure 7:
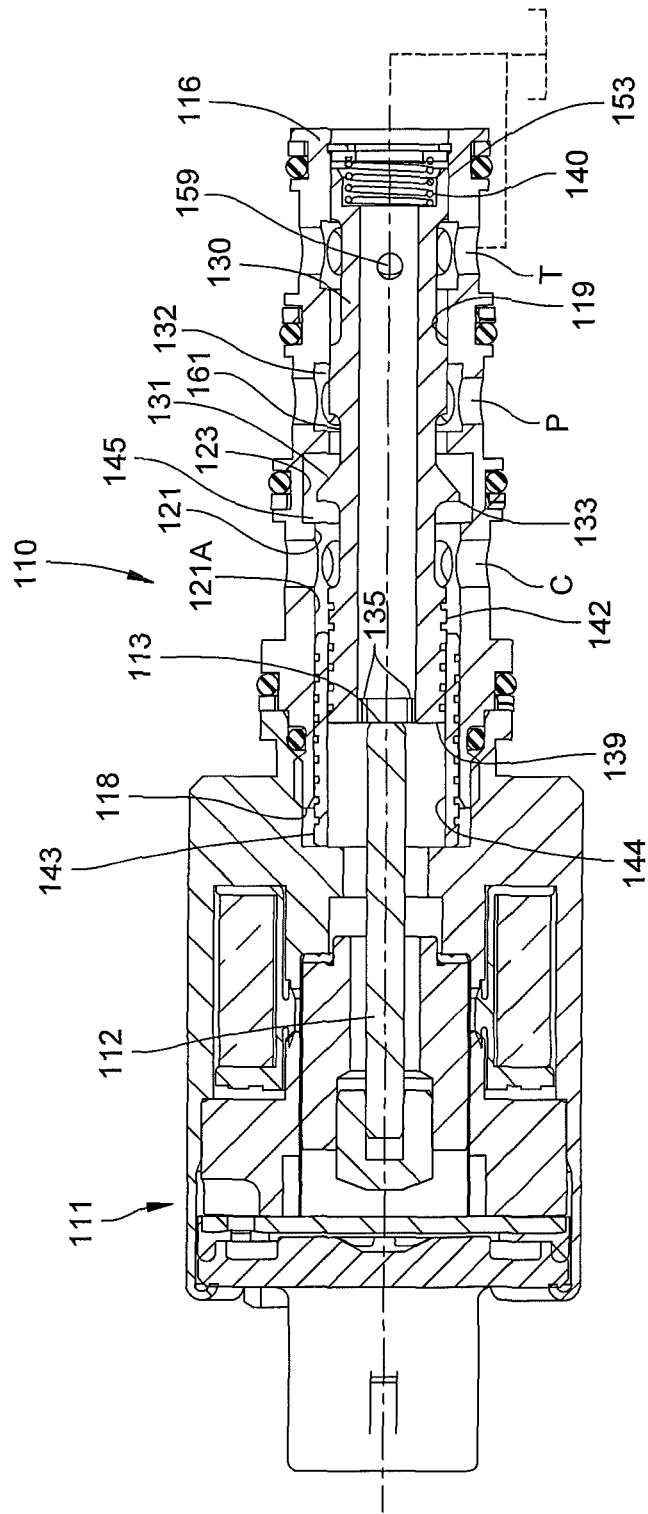
FIG. 7 is a view similar to FIG. 62 with the valve in a second operative state.
Figure 8:
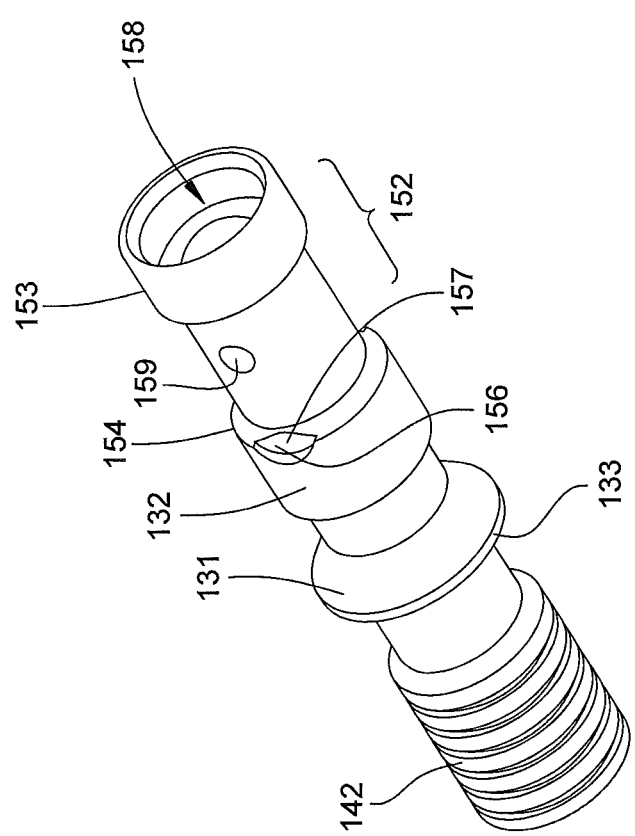
FIG. 8 is a front, right end isometric view of the spool is the aforesaid second embodiment.

An elongate and hollow spool 130, circular in cross section, is reciprocally received in the open end 118 of the internal bore 117 of the valve body 116. A cylindrical surface 132 is provided on the spool and is received in the first segment 119 of the internal bore 117, the surface 132 having a diameter that is conformed to the diameter D1 to form thereat a close sliding tolerance fit relation to the first diameter segment. The spool 130 also has an integral annular spool ring 131 that is axially spaced from the surface 132 and which is configured to be located, in the dormant state of the valve 110, within the second segment 121 of the internal bore 117. The spool ring 131 has a cylindrical radially outer circumferential surface 133 having an outer diameter D4 that is slightly less than the second diameter D2 to form a gap identical to the gap 34 between the surface of the second segment 21 and the external periphery of the annular spool ring 31 as shown in the enlarged FIG. 1A. As the spool 130 is shifted rightwardly to, for example, the FIG. 6 or FIG. 7 position, the periphery of the spool ring 131 will move to a location wholly within the third segment 123 of the internal bore 117 resulting in an enlargement of the gap between the periphery of the spool ring 131 and the surface of the second segment 121 as well as an increase in the spacing between the periphery 133 of the spool ring 131 and the internal surface of the third segment 123 having the diameter D3 as shown in FIGS. 6 and 7.

The spool 130 includes an extended portion 152 (FIG. 8) that extends into the extended portion 151 of the valve body 116. The extended portion 152 of the spool 130 includes a cylindrical surface 153 having a diameter that is conformed to the diameter D1 to form thereat a close sliding tolerance fit relation to the first diameter segment within the extended portion 151 of the valve body 116.

The cylindrical surface 132 is of a finite longitudinal length with an edge 154 thereof (FIG. 8) remote from the spool ring 131 being provided with at least one notch 156 having a tapered bottom wall 157 increasing in depth between a mid-section of the surface 132 and the edge 154. If desired, plural identical notches 156 can be provided at circumferentially spaced locations in the surface 132 and the edge 154.

The spool 130 has an axial end face 139 located at a longitudinal end of the spool that is remote from the surface 132 and is engaged by the distal end 113 of the output member 112 of the electric servomotor 111. The end face 139 closes the end of the hollow spool thereat with two vent holes 135 for hydraulic balancing and, in some cases, hydraulic damping. The opposite end of the spool 130 is open and has an axially facing abutment surface 141 opposing the abutment surface 127. A spring 140 is located between the surfaces 127 and 141 and is configured to oppose rightward movement of the spool 130.

A peripheral surface 142 at an end of the spool 130 remote from the surface 132 and adjacent the open end 118 of the valve body 116 is, in this embodiment, of the same diameter as the surface 132 and is located in an extension segment 121A of the second segment 121 of the bore 117 in the valve body 116 which has the same inner diameter as the second segment 121. This will facilitate the installation of the spring 140 and spool 130 with its larger diameter spool ring 131 into the bore 117 through the open end 118 so that the spring 140 is oriented between the abutment surfaces 127 and 141. To accommodate the radial spacing between the peripheral surface 142 and the inner surface of the extended second segment 121A, a hollow sleeve 143 is force fit or press fit into the axial end of the extension segment 121A of the second segment adjacent the open end 118 so as to be fixedly secured to the valve body 116. An interior of the hollow sleeve 143 has an internal surface 144 with a diameter conforming to the external diameter of the surface 142 to form a close sliding tolerance fit relation to the hollow sleeve 143.

In this particular embodiment, the hollow interior 158 of the spool 130 is connected to the tank port T through a radial extending passageway 159 oriented between the surfaces 132 and 153 on the spool 131 as shown in FIGS. 5 to 8. The open end and interior region of the hollow spool 130 is also connected to tank.

Operation of the FIGS. 5 to 8 Embodiment

While the operation of the valve 110 will be understood by those skilled in the art, the below set forth description of the operation is being provided only for convenience in understanding.

As stated above, the hydraulic valve 110 illustrated in FIG. 5 is in a dormant state. As depicted in FIG. 5, the spring force of the spring 140 initially locates the surface 132 on the spool 130 so as to not block the pressure supply port P and its connection to the tank port T while simultaneously blocking the connection between the pressure port P and the control port C. In addition, the spool 130 is initially oriented so that the spool ring 131 is located within the second segment 121 of the internal bore 117 as illustrated in FIG. 5.

During operation, the servomotor 111 is supplied with an electrical input command for a flow rate. The servomotor, in response to this command, causes the distal end 113 of the output member 112 to push the spool against the force of the spring 140 to thereby open communication between ports P and C. The land or surface 132 between P and T begins to partially block the connection between the port P and the port T except for the area provided by the notches 156 which serve to provide a limited connection between the port P and port T. At this stage, the notches 156 on the land or surface 132 provide the only communication between the port P and the port T.

In addition, an area (delta P sensing orifice or gap 145) between the spool ring 131 and the third segment 123 in the valve body 116, related to the notch area, will be established as shown in FIGS. 6 and 7.

As stated above, the flow of hydraulic fluid passing from the port P to the tank port T, which was available prior to activation, is restricted by the notches 156 and this restriction causes the pressure at port P to rise. If the pressure at port P cannot rise to a level adequate to overcome the pressure requirement to pass fluid to port C, there will be no flow across the spool sensing orifice 145. With no flow across the sensing orifice 145, there will not be enough load applied to the spool ring 131 to offset the load from the servomotor to thereby cause the servomotor 111 to continue to push the spool 130 to restrict the notch area and the flow from port P to port T even further.

The aforesaid will continue to happen until the pressure at port P rises to a level high enough to open the flow of fluid to port C through the gap 161 between the across flow sensing orifice 145 as shown in FIG. 6 and FIG. 7. The servomotor will continue pushing the spool 130, restricting the flow to port T, until a flow is achieved through the gap 161 and across the spool sensing orifice 145 to create a differential pressure/load working on the spool ring 131 in opposition to the servomotor output load that is adequate to balance, with the aide of the bias of the spring 140, the servomotor output load. The spool will stop moving and this flow will be maintained. Once the required flow rate is achieved it will remain at this level until commanded otherwise.

If the input command to the servomotor is either increased or decreased from this point on, the change in servomotor load sets up an imbalanced load condition. The spool 130, in response to this, either moves against the bias spring 140 to increase flow to port C or against the servomotor load to decrease flow to port C. In both cases, a load balance is reestablished when the required new flow rate is achieved.

If for some reason, the pressure requirement (working load) changes at port C, the following will occur. If the pressure requirement increases at port C, the flow rate will tend to slow down. In response to this reduction in flow rate, the pressure drop across the spool sensing orifice 145 will start to lower. The opposition load against the servomotor 111 will reduce the ability of the servomotor to move the spool against the force of the bias spring 140, thereby resulting in a decrease of the openness of the spool notch area. This decrease in notch area openness further increases the restriction from port P to port T causing the pressure at port P to rise to a level adequate to maintain the required flow to port C with a minimal reduction in flow.

On the other hand, if the pressure requirement decreases at port C, the flow rate will tend to increase. In response to this increase in flow rate, the pressure drop across the spool sensing orifice 145 will start to increase. The opposition load against the servomotor thereby increases and the spool moves against the force of the servomotor, increasing the spool notch area to port T. This increase in notch area allows the flow passing from port P to port T to do so at a lower pressure. This pressure will continue to reduce until a minimally increased flow rate from port P to port C reestablishes the load balance.

Third Embodiment of FIGS. 9 to 12

FIGS. 9 to 12 illustrate a third embodiment of a hydraulic valve embodying my invention. Since the third embodiment of FIGS. 9 to 12 includes many instances of structure identical to the first and second embodiments, the same reference numbers will be used in describing the third embodiment but will be a like 200 series number.

Figure 9:
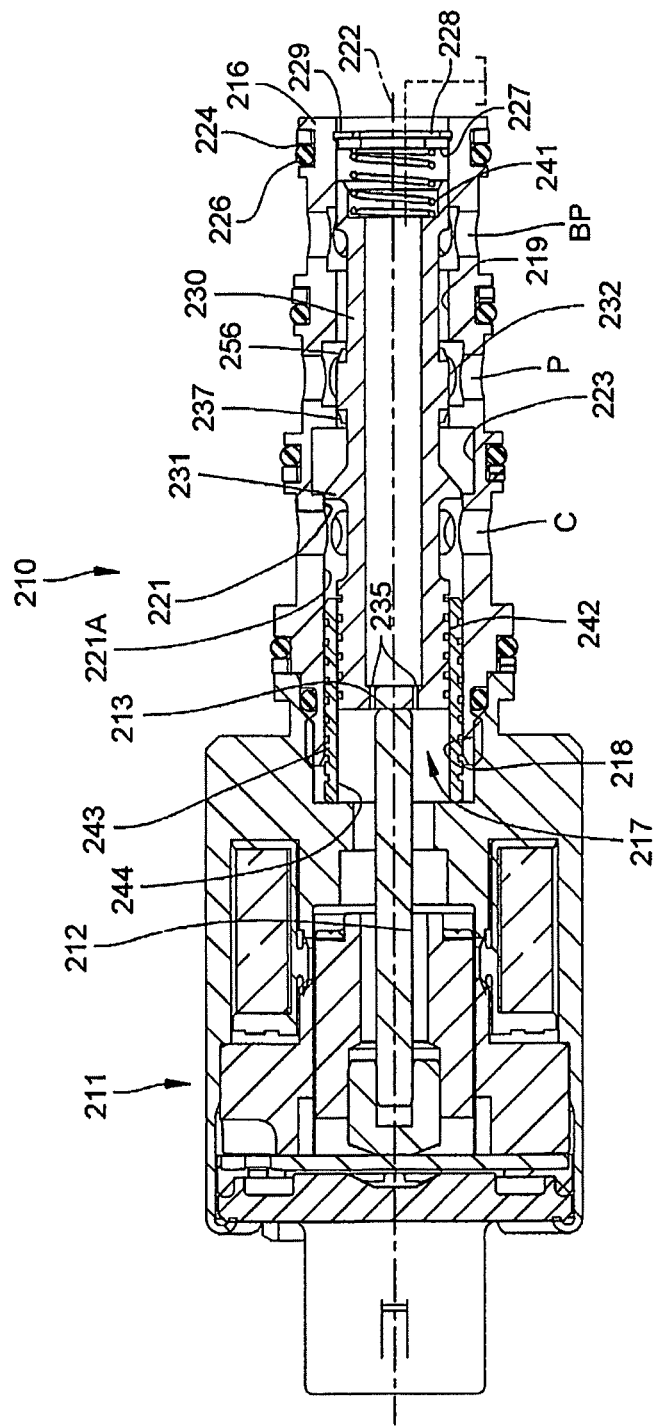
FIG. 9 illustrates a longitudinal sectional view of a hydraulic valve embodying a third embodiment of my new invention in a dormant state.

FIG. 9 illustrates the valve 210 in its dormant state, that is, no hydraulic pressure is being applied thereto and there is no supply of electrical energy. This embodiment of the valve 210 includes a conventional electric servomotor 211 having a reciprocal output member 212 having a distal end 213.

The valve 210 includes a valve body 216 that is identical in construction to the valve body 116. More specifically, the valve body 216 has an elongate and cylindrical internal bore 217 therein opening outwardly at least at one end 218 of the valve body. The internal bore 217 has, just like in the first and second embodiments, a first segment 219 with a first inner diameter D1 and a second segment 221 with a second inner diameter D2 that is larger than the diameter D1. The first and second segments are both coaxial with a longitudinal axis 222 of the internal bore 217. The two segments are located between a supply port P and a longitudinally spaced control port C, both being provided in the valve body 216. The internal bore 217 also has a third segment 223 located between the first and second segments and having a third internal diameter D3 that is larger than the diameter D2. The radially outer peripheral surface of the valve body 216 is provided with structure that forms plural and axially spaced annual grooves 224 that each house an O-ring seal member 226 to facilitate the sealed placement of the valve body 216 inside a conforming bore provided in a further structure not shown. In this particular embodiment, the valve body 216 is identical to the valve body 116; specifically, it has an extended portion 251 that is extended in a direction away from the servomotor 111 to provide a bypass port BP to facilitate a connection to a bypass circuit. The extended portion 251 of the valve body 216 includes an inner diameter conforming to the diameter D1.

The internal bore 217 of the extended portion 251 of the valve body 216 has an axially facing abutment surface 227 defined by a plate 228 resting against a spring clip 229 received an annular groove in the inner surface of the bore 217 located in the extended portion 151.

Figure 10:
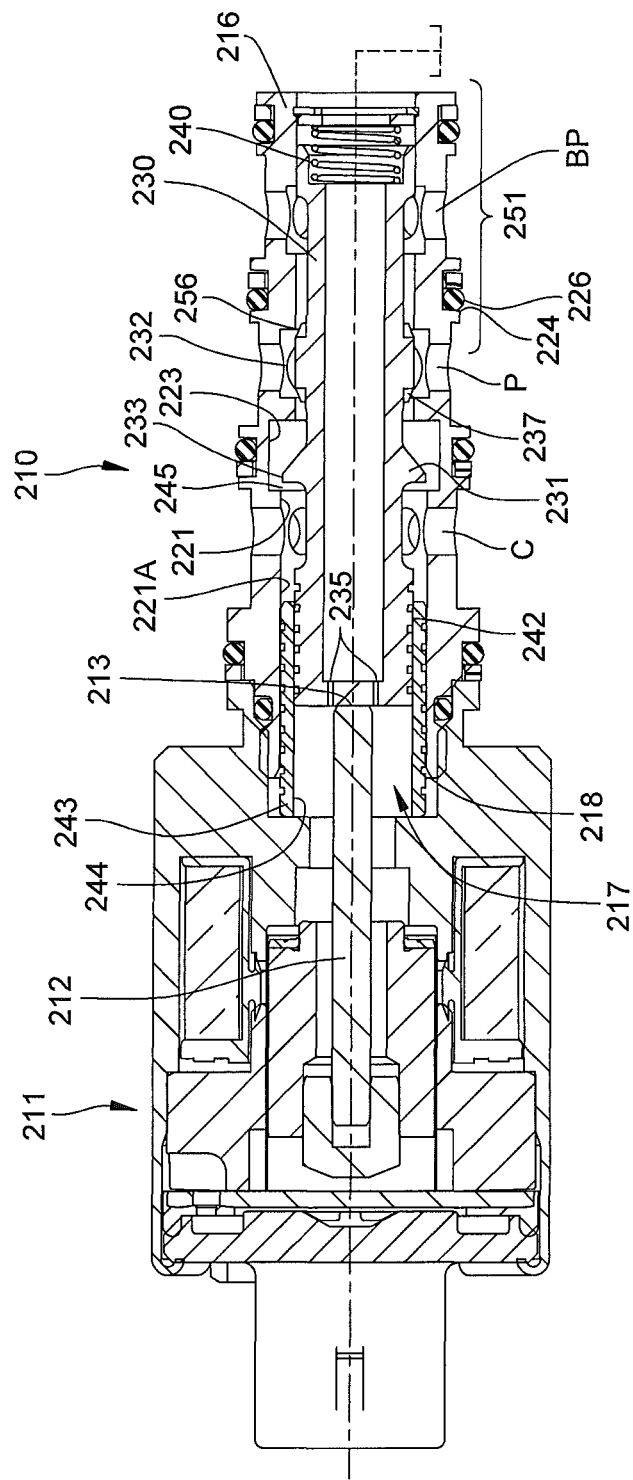
FIG. 10 is a view similar to FIG. 9 with valve in a first operative state.
Figure 11:
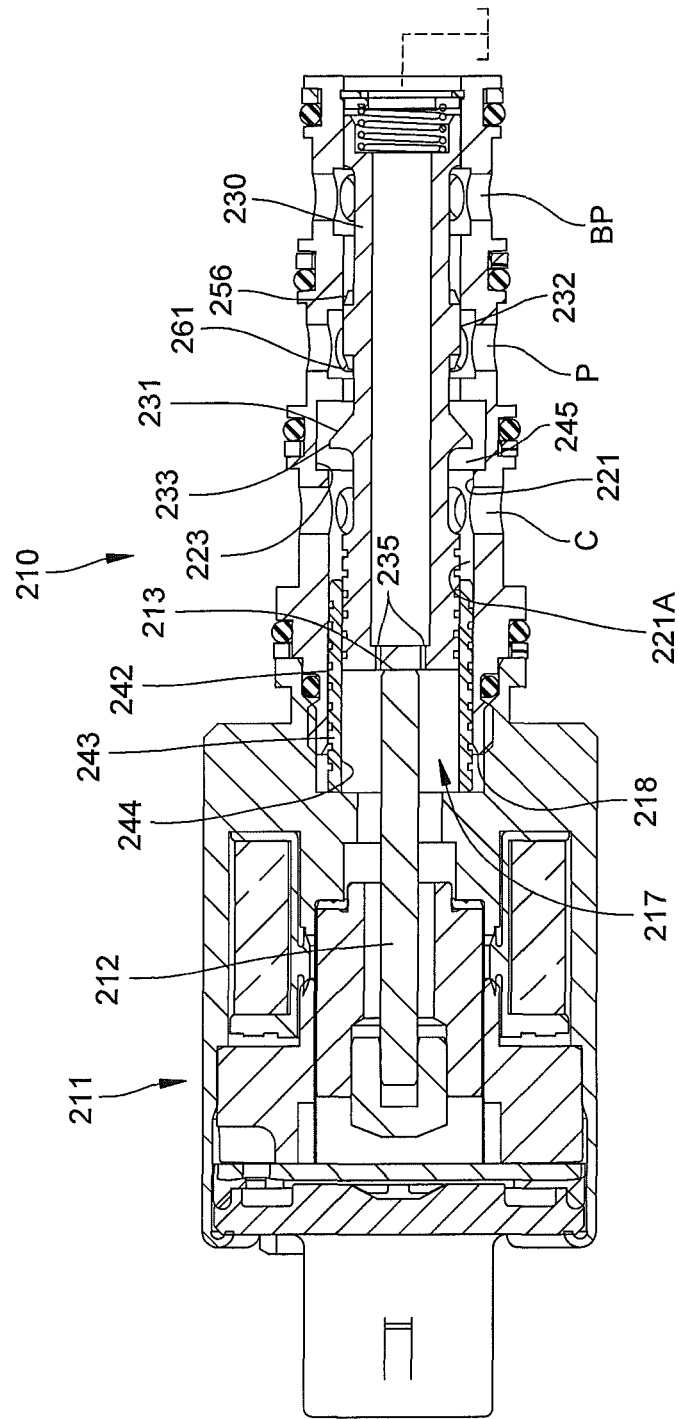
FIG. 11 is a view similar to FIG. 10 with the valve in a second operative state.
Figure 12:
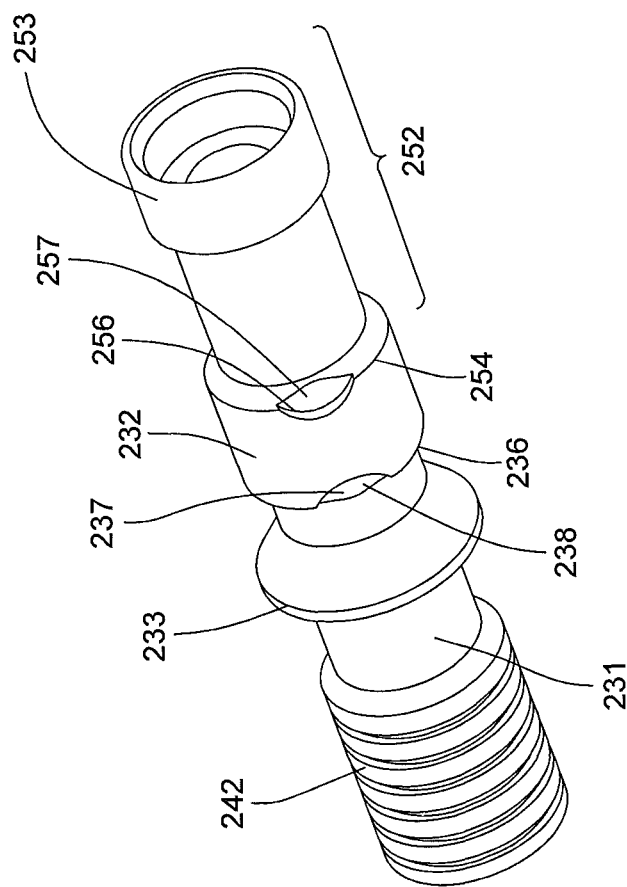
FIG. 12 is a front, right end isometric view of the spool is the aforesaid first embodiment.

An elongate and hollow spool 230, circular in cross section, is reciprocally received in the open end 218 of the internal bore 217 of the valve body 216. The spool 230 is identical to the spool 130 except for the provision of notches 236 and 256 on both laterally spaced edges 236 and 254 of a cylindrical surface 232 (FIG. 12). More specifically, the cylindrical surface 232 is provided on the spool and is received in the first segment 219 of the internal bore 217, the surface 232 having a diameter that is conformed to the diameter D1 to form thereat a close sliding tolerance fit relation to the first diameter segment. The spool 230 also has an integral annular spool ring 231 that is axially spaced from the surface 232 and which is configured to be located, in the dormant state of the valve 210, within the second segment 221 of the internal bore 217. The spool ring 231 has a cylindrical radially outer circumferential surface 233 having an outer diameter D4 that is slightly less than the second diameter D2 to form a gap identical to the gap 234 between the surface of the second segment 221 and the external periphery of the annular spool ring 231. As the spool 230 is shifted rightwardly to, for example, the FIG. 10 or FIG. 11 position, the periphery of the spool ring 231 will move to a location wholly within the third segment 223 of the internal bore 217 resulting in an enlargement of the gap between the periphery of the spool ring 231 and the surface of the second segment 221 as well as an increase in the spacing between the periphery 233 of the spool ring 231 and the internal surface of the third segment 223 having the diameter D3 as shown in FIGS. 10 and 11 to define a sensing orifice 245.

The spool 230 includes an extended portion 252 (FIG. 12) that extends into the extended portion 251 of the valve body 216. The extended portion 252 of the spool 230 includes a cylindrical surface 253 having a diameter that is conformed to the diameter D1 to form thereat a close sliding tolerance fit relation to the first diameter segment within the extended portion 251 of the valve body 216.

The cylindrical surface 232 is of a finite longitudinal length with both edges 236 and 254 thereof (FIG. 12) being provided with at least one notch 237 and 256, respectively, each having a tapered bottom wall 238, 257 increasing in depth between a mid-section of the surface 232 and the respective edges 236 and 254. If desired, plural identical notches 236 and 256 can be provided at circumferentially spaced locations in the surface 232 and the respective edges 236 and 254.

The spool 230 has an axial end face 239 located at a longitudinal end of the spool that is remote from the surface 232 and is engaged by the distal end 213 of the output member 212 of the electric servomotor 211. The end face 239 closes the end of the hollow spool thereat with two vent holes 235 for hydraulic balancing and, in some cases, hydraulic damping. The opposite end of the spool 230 is open and has an axially facing abutment surface 241 opposing the abutment surface 227. A spring 240 is located between the surfaces 227 and 241 and is configured to oppose rightward movement of the spool 230.

A peripheral surface 242 at an end of the spool 230 remote from the surface 232 and adjacent the open end 218 of the valve body 216 is, in this embodiment, of the same diameter as the surfaces 232 and 253 and is located in an extension segment 221A of the second segment 221 of the bore 217 in the valve body 216 which has the same inner diameter as the second segment 221. This will facilitate the installation of the spring 240 and spool 230 with its larger diameter spool ring 231 into the bore 217 through the open end 218 so that the spring 240 is oriented between the abutment surfaces 227 and 241. To accommodate the radial spacing between the peripheral surface 242 and the inner surface of the extended second segment 221A, a hollow sleeve 243 is force fit or press fit into the axial end of the extension segment 221A of the second segment adjacent the open end 218 so as to be fixedly secured to the valve body 216. An interior of the hollow sleeve 243 has an internal surface 244 with a diameter conforming to the external diameter of the surface 242 to form a close sliding tolerance fit relation to the hollow sleeve 243.

In this particular embodiment, the hollow interior 258 of the spool 230 is not connected to the bypass port BP but is connected to tank.

Operation of the FIGS. 9 to 12 Embodiment

In this embodiment, it is assumed that the pressure at the port BP is significantly lower than the required pressure at the port C. During operation, the servomotor 211 is supplied with a given an input command for a flow rate. The servomotor, in response to this command, pushes the spool 230 against the force of the bias spring 240 to thereby open a communication between ports P and C. The land or surface 232 between the ports P and BP is engaged into the valve body allowing the notches 256 on that edge of that land to be the only communication between the ports P and BP as shown in FIG. 10. In addition, the delta P sensing orifice 245 between the surface 233 on the spool ring 231 and the inner surface 223 defining the diameter D3 of the bore 217, related to the notch area, will be established.

The flow passing from the port P to the port BP, which was available prior to activation, is restricted by the flow notches 256 to the port BP. This restriction causes the pressure at port P to rise. If the pressure at port P cannot rise to a level adequate to overcome the pressure requirement to pass fluid to port C, there will be no flow across the spool sensing orifice 245. With no flow across the sensing orifice 245, there will not be enough spool load to offset the load applied by the servomotor 211 resulting in the servomotor continuing to push the spool 230 and restricting the notch area of the notches 256 from port P to port BP even further. This will continue to happen until the pressure at port P rises to a level high enough to provide flow to port C across the flow sensing orifice 245. The servomotor 211 will continue pushing the spool 230 and restricting the flow to port BP until a flow across the spool sensing orifice 245 is achieved that creates a differential pressure/load working on the spool ring 231 in opposition to the output load from the servomotor 211 and be adequate to balance, with the aide of the force applied by the bias spring 240, the servomotor output load. The spool 230 will stop moving and this flow will be maintained. Once the required flow rate is achieved, it will remain at this level until commanded otherwise.

If the input command to the servomotor is either increased or decreased from this point on, the change in servomotor load sets up an imbalanced load condition. The spool 230, in response to this, either moves against the force of the bias spring 240 to increase flow to port C or against the servomotor output to decrease flow to port C. In both cases, a load balance is reestablished when the required new flow rate is achieved.

More specifically, and as an example, if the pressure at the port BP is significantly lower than the required pressure at port C and if, for some reason, the pressure requirement (working load) changes at the port C, the following will occur. If the pressure requirement increases at port C, the flow rate will tend to slow down. In response to this reduction in flow rate, the pressure drop across the spool sensing orifice 245 will start to lower. The opposition load against the servomotor will be reduced and the servomotor will move the spool 230 against the force of the bias spring 240 thereby decreasing the spool notch area of the notches 256. This decrease in notch area further increases the restriction from port P to port BP to thereby raise the pressure at port P to a level adequate to maintain the required flow to port C with minimal reduction in flow.

If, on the other hand, the pressure requirement decreases at port C, the flow rate will tend to increase. In response to this increase in flow rate, the pressure drop across the spool sensing orifice 245 will start to increase. The opposition load against the servomotor increases and the spool 230 will be moved against the servomotor force to increase the spool notch area of the notches 256 to the port BP. This increase in notch area allows the flow passing from port P to port BP to do so at a lower pressure. This pressure will reduce until a minimally increased flow rate from port P to port C reestablishes the load balance.

Now suppose that the pressure at port BP is significantly higher than the required pressure at port C" and, during operation, the servomotor is supplied with given input command for a flow rate. The servomotor will push the spool 230 against the force of the bias spring 240 to the FIG. 10 or 11 position to thus cause an opening of communication, via the notches 237, between ports P and C. In addition, the delta P sensing orifice 245 will be established between the spool ring 231 and the inner surface 223 defining the diameter D3, related to the notch area, and flow will begin passing from port P, across the sensing orifice 245 to the port C to thereby create a differential pressure from one side of the spool ring 231 to the other, with the port P side being higher. This higher pressure, applied to the spool ring area, will create a load in opposition to the servomotor output load. This spool ring load plus the bias spring load will strive to obtain a load balance against the servomotor output load. The spool 230, in response to any load imbalance, will move to a position which either increases or decreases the flow from the port P to the port C until the required flow rate is achieved.

Figure 13:
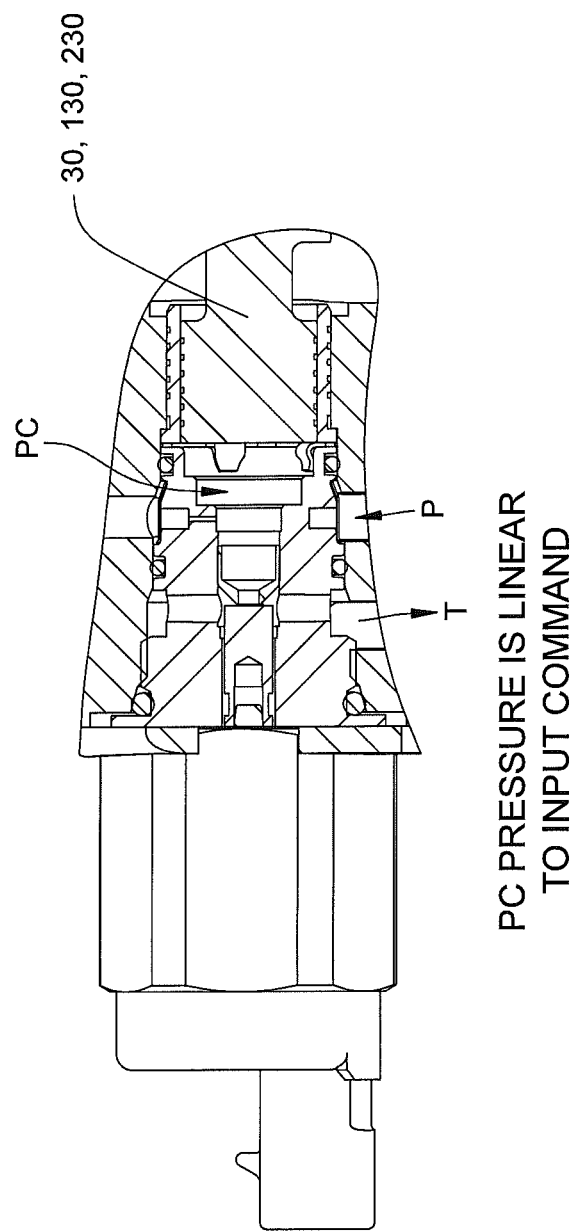
FIG. 13 illustrates a partial sectional view of a selected one of the aforementioned embodiments of the hydraulic valve controlled by a hydraulic operated pilot.

Finally, the delta P sensing orifice in all of the embodiments described above is largely based on the servomotor magnetic design and is made to compensate for the change in magnetic output load as the armature strokes to push the spool. If, as described above, the magnetic loads any given input command decreases as the servomotor strokes or extends, the delta P sensing orifice will increase as the spool is pushed. This is caused by the reduction in load available as the servomotor strokes so that a reduction in the delta P is required at any given flow rate. If the magnetic loads, at any given input command remains relatively constant as the servomotor strokes, the delta P sensing orifice area can remain constant. Therefore, and if desired, a hydraulic fluid operated pilot servomotor as shown in FIG. 13 can be used to achieve a constant stroke instead of the electric servomotors described above.

Although particular preferred embodiments of the invention have been disclosed in detail for illustrative purposes, it will be recognized that variation or modifications of the disclosed apparatus lie with the scope of the present invention.

I claim:

1. A hydraulic pressure compensated flow control valve, comprising:

a valve cartridge body having at least a supply port configured to be connected in fluid circuit with a pressurized fluid source and a control port configured to be connected in fluid circuit with a load, said valve cartridge body having a central bore therein with first, second and third diameter segments, said first diameter segment being oriented adjacent said supply port, said second diameter segment being greater in diameter than a diameter of said first diameter segment and being oriented between said first diameter segment and said control port, said third diameter segment being greater in diameter than a diameter of said second diameter segment and oriented between said first and second diameter segments, said second diameter segment defining a sensing land at an edge thereof remote from said control port;

an elongate spool reciprocally received in said central bore, said spool having a base diameter and a seal land having a primary diameter that is greater than said base diameter and is in a sliding tolerance fit relation to and in the first diameter segment of said bore to form a sliding seal, said spool having an annular spool ring having a fourth diameter that is greater in diameter than a diameter of said primary diameter and less than said second diameter segment of said bore and being oriented adjacent said sensing land to form a gap between a perimeter of said spool ring and said sensing land to cause a pressure drop across said gap in response to a flow of fluid from said pressure port through said gap to said control port;

a servomotor having an output member connected to a first end of said elongate spool and configured to reciprocate said spool within said bore, said servomotor having an output force characteristic as said output member is stroked lengthwise of said bore; and a spring oriented in said bore and against an abutment and engaging a second end of said spool remote from said first end, said spring having a spring force that is configured to oppose, along with a pressurized fluid acting on a side of said spool ring remote from said control port, said output force from said servomotor causing a lengthwise movement of said spool in said bore, a magnitude of said pressure drop across said gap combined with said spring force determining a pressure balanced location to which said spool is moved in response to said output force from said servomotor to thereby control the rate of flow of hydraulic fluid from said pressure port to said control port.

2. The hydraulic pressure compensated flow control valve according to claim 1, wherein said servomotor has an output force characteristic which varies as said output member is stroked.

3. The hydraulic pressure compensated flow control valve according to claim 2, wherein said output force from said output member decreases as said output member is stroked lengthwise of said bore.

4. The hydraulic pressure compensated flow control valve according to claim 2, wherein said output force from said output member increases as said output member is stroked lengthwise of said bore.

5. The hydraulic pressure compensated flow control valve according to claim 1, wherein said output force from said output member is constant as said output member is stroked lengthwise of said bore.

6. The hydraulic pressure compensated flow control valve according to claim 1, wherein said spool is hollow and closed to communication with said supply port and said control port.

7. The hydraulic pressure compensated flow control valve according to claim 1, wherein said spool is hollow and has a passageway through said base diameter section on a side of said seal land remote from said control port.

8. A hydraulic pressure compensated flow control valve, comprising:
a valve cartridge body having at least a supply port configured to be connected in fluid circuit with a pressurized fluid source and a control port configured to be connected in fluid circuit with a load, said valve cartridge body having a central bore therein with first, second and third diameter segments, said first diameter segment being oriented adjacent said supply port, said second diameter segment being greater in diameter than a diameter of said first diameter segment and being oriented between said first diameter segment and said control port, said third diameter segment being greater in diameter than a diameter of said second diameter segment and oriented between said first and second diameter segments, said second diameter segment defining a sensing land at an edge thereof remote from said control port;
an elongate spool reciprocally received in said central bore, spool having a base diameter and a seal land having a primary diameter that is greater than said base diameter and is in a sliding tolerance fit relation to and in the first diameter segment of said bore to form a sliding seal, said spool having an annular spool ring having a fourth diameter that is greater in diameter than a diameter of said primary diameter and less than said second diameter segment of said bore and being oriented adjacent said sensing land to form a gap between a perimeter of said spool ring and said sensing land to cause a pressure drop across said gap in response to a flow of fluid from said pressure port through said gap to said control port;
at least one notch in an edge of said seal land that is remote from said supply port, said at least one notch being configured to facilitate a regulated flow of hydraulic fluid therethrough in response to said at least one notch being connected in fluid circuit with said pressure port and said control port;
a servomotor having an output member connected to a first end of said elongate spool and configured to reciprocate said spool within said bore, said servomotor having an output force characteristic which varies as said output member strokes; and a spring oriented in said bore and against an abutment and engaging a second end of said spool remote from said first end, said spring having a spring force that is configured to oppose, along with a pressurized fluid acting on a side of said spool ring remote from said control port, said variable output force from said servomotor causing a lengthwise movement of said spool in said bore, a magnitude of said variable pressure drop across said gap combined with said spring force determining a pressure balanced location to which said spool is moved in response to said variable output force from said servomotor to thereby control the rate of flow of hydraulic fluid from said pressure port to said control port.

9. The hydraulic pressure compensated flow control valve according to claim 8, wherein said spool is hollow and closed to communication with said supply port and said control port.

10. The hydraulic pressure compensated flow control valve according to claim 8, wherein said spool is hollow and has a passageway through said base diameter section on a side of said seal land remote from said control port.

11. The hydraulic pressure compensated flow control valve according to claim 8, wherein said edge of said seal land has a plurality of notches.

12. A hydraulic pressure compensated flow control valve, comprising:
a valve cartridge body having at least a supply port configured to be connected in fluid circuit with a pressurized fluid source, a control port configured to be connected in fluid circuit with a load and a tank port configured to be connected in fluid circuit to a tank and a source of low pressure, said valve cartridge body having a central bore therein with first, second and third diameter segments, said first diameter segment being oriented adjacent said supply port, said second diameter segment being greater in diameter than a diameter of said first diameter segment and being oriented between said first diameter segment and said control port, said third diameter segment being greater in diameter than a diameter of said second diameter segment and oriented between said first and second diameter segments, said second diameter segment defining a sensing land at an edge thereof remote from said control port;
an elongate spool reciprocally received in said central bore, said spool having a base diameter and a seal land having a primary diameter that is in a sliding tolerance fit relation to and in the first diameter segment of said bore to form a sliding seal, said spool having an annular spool ring having a fourth diameter that is greater in diameter than a diameter of said primary diameter and less than said second diameter segment of said bore to form a gap between a perimeter of said spool ring and said sensing land to cause a pressure drop across said gap in response to a flow of fluid from said pressure port through said gap to said control port;
at least one notch in an edge of said seal land that is closest to said tank port, said at least one notch being configured to facilitate a regulated rate of flow of hydraulic fluid from said pressure port therethrough to said tank port;
a servomotor having an output member connected to a first end of said elongate spool and configured to reciprocatingly drive said spool within said bore, said servomotor having an output force characteristic which varies as said output member stroked lengthwise of said bore; and a spring oriented in said bore and against an abutment and engaging a second end of said spool remote from said first end, said spring having a spring force that is configured to oppose, along with a pressurized fluid acting on a side of said spool ring remote from said control port, said driving movement of said spool initiated by said servomotor, a magnitude of said variable pressure drop across said gap determining a pressure balanced location to which said spool is moved in response to said variable output force from said servomotor to thereby control the rate of flow of hydraulic fluid flowing from said pressure port to said tank port and to said control port.

13. The hydraulic pressure compensated flow control valve according to claim 12, wherein said spool is hollow and has a passageway through said base diameter section on a side of said seal land remote from said control port and configured to be connected to both of said supply port and said tank port in response to said spool being moved by said output force of said servomotor to said pressure balanced position.

14. The hydraulic pressure compensated flow control valve according to claim 12, wherein said edge of said seal land has a plurality of notches.

15. A hydraulic pressure compensated flow control valve, comprising:

a valve cartridge body having at least a supply port configured to be connected in fluid circuit with a pressurized fluid source, a control port configured to be connected in fluid circuit with a load and a bypass port configured to be connected in fluid circuit to a secondary circuit, said valve cartridge body having a central bore therein with first, second and third diameter segments, said first diameter segment being oriented adjacent said supply port, said second diameter segment being greater in diameter than a diameter of said first diameter segment and being oriented between said first diameter segment and said control port, said third diameter segment being greater in diameter than a diameter of said second diameter segment and oriented between said first and second diameter segments, said second diameter segment defining a sensing land at an edge thereof remote from said control port;

an elongate spool reciprocally received in said central bore, said spool having a base diameter and a seal land having a primary diameter that is in a sliding tolerance fit relation to and in the first diameter segment of said bore to form a sliding seal, said spool having an annular spool ring having a fourth diameter that is greater in diameter than a diameter of said primary diameter and less than said second diameter segment of said bore to form a gap between a perimeter of said spool ring and said sensing land to cause a variable pressure drop across said gap in response to a flow of fluid from said pressure port through said gap to said control port;

at least one notch in longitudinally spaced edges of said seal land that is closest to said spool ring and closest to said bypass port, said notches being configured to facilitate a regulated flow of hydraulic fluid from said pressure port therethrough to said control port and a regulated flow of hydraulic fluid from said pressure port to said bypass port and to said control port;

a servomotor having an output member connected to a first end of said elongate spool and configured to reciprocatingly drive said spool within said bore, said servomotor having an output force characteristic which varies as said output member strokes; and a spring oriented in said bore and against an abutment and engaging a second end of said spool remote from said first end, said spring having a spring force that is configured to oppose, along with a pressurized fluid acting on a side of said spool ring remote from said control port, said variable output force from said servomotor causing a driving movement of said spool, a magnitude of said variable pressure drop across said gap combined with said spring force determining a pressure balanced location to which said spool is moved in response to said variable output force from said servomotor to thereby control the rate of flow of hydraulic fluid flowing from said pressure port to said bypass port and to said control port.

16. The hydraulic pressure compensated flow control valve according to claim 15, wherein said spool is hollow and has a passageway through said base diameter section on a side of said seal land remote from said control port and configured to be connected to both of said supply port and said tank port in response to said spool being moved by said output force of said servomotor to said pressure balanced position.

17. The hydraulic pressure compensated flow control valve according to claim 15, wherein each of said edges of said seal land has a plurality of notches.

* * * * *